United States Patent Office 3,813,367
Patented May 28, 1974

3,813,367
LACTAM POLYMERIZATION WITH HALOGEN
SUBSTITUTED AROMATIC INITIATORS
Markus Matzner, Edison, and James E. McGrath,
Somerville, N.J., assignors to Union Carbide Corporation, New York, N.Y.
No Drawing. Filed Oct. 10, 1969, Ser. No. 865,487
Int. Cl. C08g 20/18
U.S. Cl. 260—78 L                                22 Claims

ABSTRACT OF THE DISCLOSURE

Certain halogen substituted aromatic compounds are utilized as polymerization initiators or activators with alkaline catalysts in the anionic polymerization of lactam monomers to provide long pot life, a rapid polymerization and novel polymers. The initiators are compounds containing at least one carbocyclic aromatic ring substituted with at least one halogen atom which has been activated towards nucleophilic substitution.

BACKGROUND OF THE INVENTION

1. Field of the invention

The invention relates to the anionic polymerization of lactam monomers, and to the preparation of novel lactam polymers.

2. Description of the prior art

The polymerization of lactam monomers has been generally conducted via two polymerization techniques, that is, either by hydrolytic polymerization or by anionic polymerization. The hydrolytic polymerization is less advantageous from a commercial point of view because it requires prolonged polymerization times. The anionic polymerization technique, on the other hand, can be conducted in a relatively short period of time, and is therefore amenable for use in the in situ polymerization of the lactams in conventional molding, i.e., casting and extrusion equipment.

In the anionic polymerization of lactams there is usually employed a catalyst/initiator system. The catalyst is commonly a material which will form an alkali or alkaline earth metal salt of the lactam. The initiators or activators that have been used to date include acylated lactams. In the anionic polymerization of ε-caprolactam, for example, acetyl caprolactam has been used as an initiator.

The catalyst-initiator systems which have been used to date, however, to prepare polymers in the anionic polymerization of lactams have disadvantages in that they usually do not provide for any extended pot life for the polymerization system. As a result, the mixing of the catalyst and the initiator species with the monomer being polymerized usually take place just prior to the intended molding, i.e., casting, extrusion, etc., operation. Even when the catalyst and initiator species are so added to the monomer, a premature polymerization reaction may still occur before proper admixing of all the components of the system is achieved. Such premature reactions result in the fabrication of molded articles which contain voids, are non-uniform and have relatively low impact strength.

SUMMARY OF THE INVENTION

Lactams are anionically polymerized in a relatively fast period of time utilizing a catalyst-initiator system which provides extended pot life of the polymerization system. The system contains an anionic catalyst and, as the initiator or activator, certain halogen substituted aromatic compounds. Novel polymers are prepared.

An object of the present invention is to provide an anionic polymerization process whereby lactams may be readily polymerized in a polymerization system having an extended pot life.

Another object of the present invention is to provide a novel initiator or activator for use in the anionic polymerization of lactams.

A further object of the present invention is to provide novel lactam polymers having thermally stable end groups.

DESCRIPTION OF THE PREFERRED EMBODIMENT

It has now been found that lactams may be readily polymerized anionically to provide novel polymers with a polymerization system that has an extended pot life, if there is employed as the catalyst-initiator system for such polymerization, an anionic catalyst and, as an initiator or activator, one or more of certain halogen substituted aromatic compounds. These initiators are compounds which contain at least one carbocyclic aromatic ring substituted with at least one halogen atom which has been activated towards nucleophilic substitution.

The lactams

The lactams which may be polymerized according to the present invention are preferably those lactam monomers which contain at least one ring group of the structure

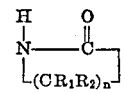

wherein $n$ is a whole number which is 3 to 15, and preferably 3 to 10, and $R_1$ and $R_2$ may be the same or different radicals on each carbon atom and may be H or $C_1$ to $C_{10}$ hydrocarbon.

Such lactams would include those having a single ring structure such as 2-pyrrolidone, 2-piperidone, 6-methyl-2-piperidone, ε-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bis-lactams such as alkylene bis-lactams of the formula:

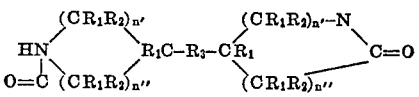

wherein $n'$ and $n''$ are each whole numbers such that $n'$ and $n''$ is 2 to 14; $R_1$ and $R_2$ are as defined above; and $R_3$ may be $C_1$ to $C_4$ alkylene such as methylene, ethylene, propylene and butylene; phenylene and substituted phenylene; O and S.

Other lactams having a plurality of ring structures include bicyclic lactams, such as those represented by the formulae:

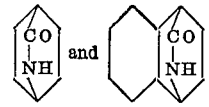

The lactams to be polymerized can be used individually or in any combination thereof.

The initiator

The initiator which is to be employed in the present invention is a compound containing at least one homocyclic aromatic ring substituted with at least one halogen atom which has been activated towards nucleophilic substitution. The preferred, for the purposes of the present invention, of such compounds are represented by the following three structures:

I

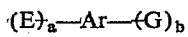
(E)ₐ—Ar—(G)_b wherein

E is halogen, i.e., Br, Cl, I and/or F, Ar is a mono- or polynuclear aryl moiety residue, G is H, $C_1$ to $C_{10}$ hydrocarbon, NO, $SO_2R$, COR, $CCl_3$, $CF_3$ and/or CN, R is $C_1$ to $C_{10}$ hydrocarbon, a is a whole number which is 1 up to a number representing the number of substituents sites of Ar, b is zero or a whole number of a value such that the number of substituent sites of Ar minus a equals b, and the H and hydrocarbon substituents directly bonded to Ar are present in no more than $a+b-2$ positions.

II

$(E')_c$—$Ar_1$—$[X$—$Ar_2$—$Q_m]_n$ wherein

E' is halogen, H, $C_1$ to $C_{10}$ hydrocarbon, $CCl_3$, NO, $SO_2R$, COR, $CF_3$ and/or CN, with the proviso that at least one E' is halogen, $Ar_1$ and $Ar_2$ are the same or different mono- or polynuclear aryl moiety residues, X is SO, $SO_2$, CO, N=N, $C(CF_3)_2$, $C(CN)_2$, $CCl_2$, $CBr_2$, $CF_2$, $CI_2$, and/or POR, Q is halogen, H, $C_1$ to $C_{10}$ hydrocarbon, NO, $CCl_3$, $SO_2R$, COR, $CF_3$, and/or CN, with the proviso that at least one Q is not H when X is $SO_2$ or CO, R is $C_1$ to $C_{10}$ hydrocarbon, c is a whole number which is 1 up to a number representing 1 less than the number of substituent sites of $Ar_1$, n is a whole number which is at least 1 and is such the number of substituent sites of $Ar_1$ minus c equals n, and m is a whole number such that $m+1$ equals the number of substituent sites of $Ar_2$.

III

wherein

E'' is halogen, H, $C_1$ to $C_{10}$ hydrocarbon, $CCl_3$, NO, $SO_2R$, COR, $CF_3$, and/or CN, with the proviso that at least one E'' is halogen, Ar' and Ar'' are the same or different mono- or polynuclear aryl moiety residues, Q' is halogen, H, $C_1$ to $C_{10}$ hydrocarbon, NO, $CCl_3$, $SO_2R$, COR, $CF_3$ and/or CN Z' and Z'' are the same or different and are SO, $SO_2$, CO, N=N, $C(CF_3)_2$, $C(CN)_2$, $CCl_2$, $CBr_2$, $CF_2$, $CI_2$ and/or POR, R is $C_1$ to $C_{10}$ hydrocarbon, d is a whole number which is 1 up to a number representing 2 less than the number of substituent sites of Ar', and e is a whole number which is 1 up to a number representing 2 less than the number of substituent sites of Ar''.

The term $C_1$ to $C_{10}$ hydrocarbon, as used in the context of the present invention, includes all saturated or unsaturated hydrocarbon radicals containing 1 to about 10 carbon atoms such as $C_1$ to $C_{10}$ alkyl, such as methyl, ethyl, propyl, isopropyl, butyl, isobutyl, amyl, isoamyl, hexyl, isohexyl, cycloheptyl; aryl such as phenyl, tolyl, xylyl, phenylethyl, cumenyl, styryl and naphthy, and akenyl such as vinyl, propenyl and butenyl.

Where more than one R radical is present in the structure of an initiator or a lactam, such radicals may be the same or different.

The term aryl moiety residue, as used in the context of the present invention, means the carbocyclic residue of an aryl compound, which may be mono- or polynuclear in nature.

The initiators of the present invention all contain aryl compounds which are substituted by at least one halogen atom and by at least one other substituent which is selected from specific groups of substituents, and which other substituents activate the halogen substituents towards nucleophilic substitution. The other substituent may be a halogen atom which is the same as or different than, the activated halogen substituent.

The term activated means, in the context of the present invention, and with respect to the activated halogen, that such halogen is readily amenable to nucleophilic displacement by a base, for example, the lactam anion.

Initiators of the I structure include mono- and polyhalogenated aromatic compounds. These compounds would include (halophenyl)(phenyl)sulfones such as (chloro phenyl) phenyl sulfone and (fluorophenyl)phenyl sulfone; halobenzonitriles such as fluorobenzonitrile, chlorobenzonitrile and bromobenzonitrile; polyhalogenated benzenes such as 1,3,5 - trifluorobenzene, 1,3 - dichloro - 5 - fluorobenzene, 1,2,4 - trifluoro benzene, 1,4-dichloro benzene and 1,4-difluorobenzene; polyhalogenated naphthalenes such as 1,2,4 - trifluoronaphthalene and 2 - bromo - 3 - fluoro naphthalene; polyhalogenated anthracenes and phenanthrenes such as 1,4 - difluoro anthracene and 1,2-dichloro - 4 - fluoro phenanthrene and other compounds such as o-, m- and p- chloro- and fluoro-trifluoromethylbenzene, 1 - fluoro - 4 - trifluoromethyl naphthalene, 1 - bromo - 4 - trichloromethyl anthracene, 1 - nitroso - 3,4 - difluorobenzene and 1,3-diacetyl-5-chlorobenzene.

Preferred initiators having the I structure are:

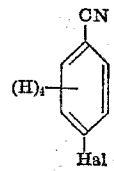

where Hal is F or Cl,

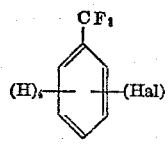

where Hal is F or Cl and Hal is in an o, m or p position,

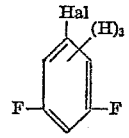

where Hal is F or Cl,

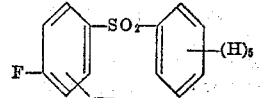

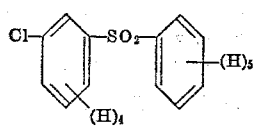

The initiator compounds having the II type structure also include mono- and polyhalogenated compounds such as bis(halophenyl)sulfones such as bis(chlorophenyl)sulfone, bis(bromo phenyl)sulfone, bis(iodophenyl)sulfone and bis(fluorophenyl)sulfone; (chlorophenyl)(bromophenyl)sulfone (chlorophenyl)(fluorophenyl)sulfone and bis(dichlorophenyl sulfone); bis(dibromophenyl)sulfone and (dichlorophenyl) (bromophenyl)sulfone, 4,4'-difluorobenzophenone, 4-cyano-4'-chlorobenzophenone, 4,4'-dichlorodiphenyl sulfoxide, 4,4',5'-tribromobenzophenone, 2,3,5-tricyano-4'-fluorodiphenyl sulfone, and 2-nitroso-4-chloro-diphenyl sulfoxide, difluorodiazobenzene, bis(dihalophenyl)bis(trifluoromethyl)methane, bis(halonaphthyl)sulfone, bis(dihalonaphthyl)sulfoxide, bis(dihalonaphthyl)methyl phosphine oxide and bis(halophenyl)dihalomethane.

The preferred of the II structure initiators are the bis (halophenyl)sulfones, and in particular bis(p-chlorophenyl)sulfone and bis(p-fluorophenyl)sulfone.

Initiators having III structures include disubstituted thianthrene di- or tetraoxide derivatives such as the 2,7-dichloro, the 2,7-difluoro, the 1,2-dicyano-7,8-dichloro, and the 7,8-dibromo thianthrene di- or tetraoxides. Other III compounds would include aryl substituted halo thianthrene di -or tetraoxides as well as arylene substituted derivatives such as benzo- or naphtho halo thianthrene di- and tetraoxides. Aromatic quinones, such as 2,7-dichloroanthraquinone and halogenated polynuclear quinones such as 1,2,7-trifluoro-5,6-benzoanthraquinone are also useful.

The preferred of the initiators having the III structure are:

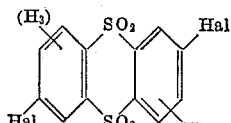

and

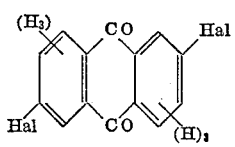

wherein Hal is F or Cl.

The initiators may be used individually or in combination with one or more other initiators. About 0.1 to 10 moles of initiator are employed per 100 moles of lactam monomer being polymerized.

The polymers

The use of the initiators of the present invention results in the preparation of polymers having the structure

wherein

Res is the aryl moiety residue of the initiator that has been dehalogenated of at least one active halogen substituent, L is a polymerized chain of one or more lactam monomers, and $m$ is a whole number which is 1 up to the active halogen functionality of the initiator.

The L chains of lactam monomer attach to the residue of the initiator at the site of, and upon the removal during the intiating reaction of, the active halogen substituents.

Thus, the lactam monomer and the initiator are believed to react according to the following two step procedure as shown here in the idealized case in which all the active halogens take part in the reaction:

(1)
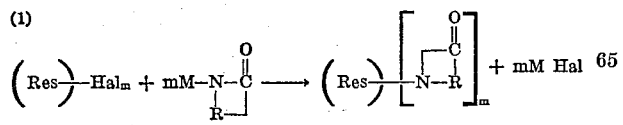

(2)
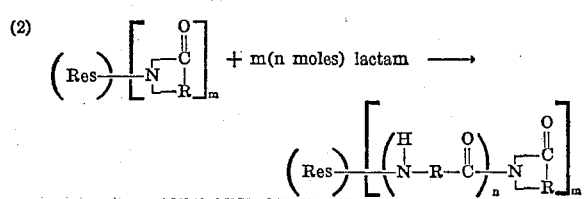

wherein

Res and $m$ are as defined above,

Hal is the active halogen substituent,

M is the cation of the anionic catalyst,

R is that portion of the lactam structure lying between the nitrogen and carbonyl carbon atom of the lactam and $n$ is a whole number which is >1 and is such that the polymer is a material that is normally solid, i.e., solid at temperatures of about 25° C., and has a reduced viscosity in m-cresol at 25° C. of ≧0.5, and preferably about 0.8 to 7.

The value of $n$ may vary somewhat in each polymerized lactam chain, and will be about 10 to about 5000. The polymers would thus have molecular weights of about 1000 to 500,000 or more.

The catalyst

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organo-metallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, and preferably 0.5 to 6 mole percent of catalyst is used per mole of monomer being polymerized.

The catalyst and initiator are employed in a mole ratio to each other of about 2 to 20, and preferably, 3 to 12.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

The polymerization process

The polymerization reaction is preferably conducted in bulk. Under such bulk polymerization procedures the monomer, catalyst and initiator are first charged in the desired proportions to the reactor. This bulk polymerization reaction system may be stored in the liquid or molten state at temperatures which are slightly above the melting point of the monomeric lactam, i.e., about 70–75° C. for ε-caprolactam monomers, for up to about 40 hours without any appreciable change in the viscosity of the system or potency of the catalyst-initiator system. This provides an unusually long pot life for the molten system at such temperatures. The pot life is shorter at higher temperatures, i.e., between about 80° and 130° C. for ε-caprolactam, and at temperature of about 130°–240° C. the ε-caprolactam polymerization reaction proceeds within a few minutes. The bulk polymerization reaction is usually conducted at atmospheric pressure and at a temperature of about 130 to 200° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 130°–200° C. depending on the lactam(s) employed, and the polymerization temperature. The bulk polymerization reaction should be carried out under anhydrous conditions i.e., in the presence of no more than about 0.3 weight percent, and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and of destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can both be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130 to 240° C. in dispersion systems such as those disclosed in U.S. 3,061,592 and 3,383,352, and by G. B. Gechele and G. F. Martins in J. Applied Polymer Science 9, 2939 (1965).

Adjuvants

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercptan or hydroxyl groups.

The adjuvants would be used in amounts which would be effective for the intended purpose. Thus, a stabilizer would be used in a stabilizingly effective quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

EXAMPLE 1

Into a flask fitted with thermometer, stirrer, argon inlet and a water condenser were placed 56.5 gm. (0.5 mole) of ε-caprolactam. The flask was heated to 100° C. by an oil bath to melt the monomer. Sodium hydride, 0.25 gm. ($10^{-2}$ moles or 2 mole percent based on the monomer), was added to form sodium ε-caprolactam in the ε-caprolactam. 4,4'-dichlorodiphenylsulfone (DCDPS) 0.72 gm. ($2.5 \times 10^{-3}$ mole or 0.5 mole percent), was added and quickly dissolved to form a homogeneous solution. No change in viscosity was observed over a period of ten minutes. The solution was then quickly heated to 160° C. The viscosity started to rise after five minutes and at twenty minutes the polymer had crystallized away from the wall of the flask. The solid, tough polymer was ground in a Wiley mill, continuously extracted with boiling water for 24 hours and then dried. The polymer was 95.4% insoluble in water and had a reduced viscosity (R.V.) in m-cresol (0.1%, 25° C.) of 5.58 deciliters/gm.

EXAMPLE 2

The procedure of Example 1 was followed using 4,4'-difluorodiphenyl sulfone as the initiator (0.64 gm., $2.5 \times 10^{-3}$ moles, 0.5 mole percent). At 160° C., an increase in the viscosity of the system was observed after one minute, and the system was too viscous to stir after twelve minutes. The crystallized polymer was removed after a total reaction time of thirty minutes. The polymer was 95% insoluble in water and had an R.V. in m-cresol of 6.9.

EXAMPLE 3

Example 1 was repeated by adding the NaH and then the 4,4'-dichlorodiphenylsulfone to liquid ε-caprolactam at 80° C. The solution was still stirring with no significant change in the solution viscosity after twenty hours. This illustrates the long pot life possible with the initiators of the present invention. Furthermore the latent system was demonstrated to be still highly active by then raising its temperature to 170° C. Solid polymer was formed within seven minutes. The R.V. of the polymer in m-cresol was 4.3.

EXAMPLE 4

To further illustrate the improvement shown in Example 3 in pot life, N-acetyl-ε-caprolactam was used as the initiator at the same molar concentration (0.5% based on the monomer) as was the dichlorodiphenylsulfone. At 80° C., premature polymerization was occurring within five minutes. The Izod impact of the polymer made with the N-acetyl-ε-caprolactam initiator, moreover, was only 0.57 ft.-lbs./in. of notch as compared with values of 1.0–1.2 for polymer product made with the dichlorodiphenylsulfone initiator.

EXAMPLE 5

The rate of polymerization in the temperature range of 160–200° C. can be accelerated without losing pot life at 75–80° C. by using higher catalyst concentrations such as four mole percent as described in this example. An electrically heated 6" x 6" x 1/8" open mold enclosed in an argon atmosphere was filled with 95 ml. of an ε-caprolactam solution containing four mole percent of sodium hydride catalyst and one mole percent of dichlorodiphenylsulfone. The temperature of the monomer as measured by a thermocouple was adjusted to 170° C. Solid polymer was formed after 2.5 minutes. The polymer was allowed to slowly cool whereupon it released itself, from the mold. A tough plaque was obtained which had the following properties: tensile modulus 526,000 p.s.i., tensile strength 11,500 percent elongation 55, tensile impact 260 ft.-lbs./in.$^3$, Izod 1.0 ft.-lbs./in. notch and heat distortion temperature 109° C. (264 p.s.i.), 200° C. (66 p.s.i.). The R.V. of the polymer in m-cresol was 4.5.

EXAMPLE 6

The conditions in Example 5 were repeated at a monomer temperature of 190° C. Analysis by gas chromatography showed only 3 percent monomer remained after 3.8 minutes polymerization time.

EXAMPLE 7

ε-Caprolactam (56.5 gm., 0.5 mole) was heated to 110° C. under argon and transferred to a test tube. A catalyst solution was formed by reacting sodium hydride (0.24 gm., 0.01 mole, 2 mole percent, 0.42 gm. of a mineral oil dispersion) with the ε-caprolactam. After five minutes, p-fluorophenyl phenyl sulfone (0.60 gm., 0.00254 mole, 0.5 mole percent) was added. The tube was shaken to dissolve the initiator and then was placed in a 180° C. oil bath. After three minutes, the solution had become so viscous that no flow took place when the tube was inverted. After five minutes crystallization of the polymer was observed. A light yellow colored hard polymer plug was easily removed from the tube after it had cooled. The mole percent of the initiator and catalyst which were used was based on the ε-caprolactam charge. The R.V. of the polymer in m-cresol was 2.5.

EXAMPLE 8

The conditions of Example 7 were repeated with 2.6 dichlorobenzonitrile (1.0 gm. 0.0585 mole, 1.2 mole percent) as the initiator. The polymer crystallized after six minutes of heating.

EXAMPLE 9

Example 7 was repeated with 3,4,3',4'-tetrachlorodiphenylsulfone (1.0 gm., 0.0234 mole, 0.47 mole percent) as the initiator. The viscosity of the solution quickly rose and the amber polymer crystallized after six minutes of heating.

EXAMPLE 10

Example 7 was repeated with p-fluorobenzonitrile (0.5 gm., 0.41 mole, 0.83 mole percent) as the initiator. The polymer would no longer flow after 2.5 minutes and was crystallized after five minutes. The R.V. of the polymer was 3.34. The color of the cast nylon 6 was a very light greenish white.

EXAMPLE 11

Example 7 was repeated with 4-fluoro, 4'-chloro, diphenylsulfone (0.7 gm., 0.0258 mole, 0.52 mole percent) as the initiator. The polymer would no longer flow after 2 minutes and had completely separated from the glass tube after ten minutes of heating. The polymer was not completely soluble in m-cresol which indicated a very high molecular weight. The polymer had an Izod value of 1.45 ft.-lbs./inch of notch.

EXAMPLE 12

The conditions of Example 7 were repeated with 2,7-dichlorothianthrene tetraoxide(I) (0.5 gm., 0.0143 mole, 0.29 mole percent) as the initiator.

(I)
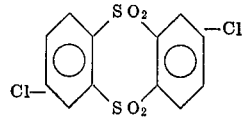

After twenty minutes, an amber solid polymer had formed which crystallized from the walls of the glass tube. The polymer had an Izod value of 1.39 ft.-lbs./inch of notch.

EXAMPLE 13

The conditions of Example 7 were repeated with 4,4'-difluorodiphenyl benzophenone (0.6 gm., 0.0276 moles, 0.55 mole percent) as the initiator. There was no flow in the system after seven minutes and crystallization of the polymer occurred after eight minutes.

EXAMPLE 14

A rotational molding experiment was performed to further demonstrate the utility of the new initiators in the formation of hollow objects. A premixed one pot system was made as follows: To 1000 grams of ε-caprolactam (8.85 moles) held at 80° C. were added 7.45 grams of a dispersion of NaH in mineral oil. The dispersion contained about 57 weight percent of NaH, so that 0.177 moles or 4.25 grams or 2 mole percent of NaH used. After solution 4,4'-dichlorodiphenyl sulfone (6.28 gm., 0.0219 mole, 0.25 mole percent) was added as the initiator. A ball mold with a small opening was used. The monomer-catalyst-initiator premix (100 ml.) was syringed into the mold which was then transferred to a rotationally molded oven preheated to 220° C. The ball mold was rotated at 12 r.p.m. for twenty minutes and then water cooled to room temperature. The product easily separated from the mold, and was hard, of uniform thickness, spherical and 4 inches in diameter. The unique temperature dependence of the initiator is believed to be an important factor in obtaining uniform (1/8") thickness by rotational molding techniques.

EXAMPLE 15

ε-Caprolactam (56.5 gm., 0.5 mole) was heated at 100° C. under nitrogen and transferred to a test tube. The catalyst solution was formed by reacting sodium hydride (0.73 gm., 0.03 mole, 6 mole percent, 1.28 g. of a mineral oil dispersion) with the caprolactam. After evolution of hydrogen ceases, p-chlorobenzotrifluoride (0.9 g., 0.003 mole, 1 mole percent) was added. The test tube was shaken to ensure good mixing and was then placed in a 200° oil bath. After five minutes the solution had become so viscous that no flow took place when the tube was inverted. After six minutes crystallization occurred. The polymer plug was easily removed after it had cooled.

EXAMPLE 16

Conditions for Example 15 were repeated with o-chlorobenzotrifluoride (0.9 g., 0.0003 mole, 1 mole percent) being used as the initiator. There was no flow after 9.5 minutes and crystallization took place almost simultaneously.

EXAMPLES 17-19

The rate of polymerization and the physical properties of the resulting polymer can be improved by adding dipolar aprotic solvent to the polymerization system. These solvents increase the rate of the nucleophilic displacement reaction involved in the utilization of the initiators of the present invention and thereby increase the rate of the polymerization reaction. These solvents include hexamethylphosphoramide (HMPT) and dimethyl sulfoxide (DMSO). The amounts of these solvents which are employed are catalytic quantities, i.e., of the order of about 0.1 to 20 mols of solvent per mol of initiator being employed.

A series of three experiments were conducted to illustrate the advantages of using such dipolar aprotic solvents. In each of these experiments 56.5 grams (0.5 mol) of $\epsilon$-caprolactam monomer was polymerized at 180° C. using 2 mol percent of sodium hydride catalyst and 0.5 gram ($1.74 \times 10^{-3}$ mol) of 4,4'dichloro diphenyl sulfone as the initiator. One of the experiments was used as a control and in each of the others 2 ml. (3.5 volume percent) of a dipolar aprotic solvent was used. The dipolar aprotic solvent was used as a solvent medium for the initiator. The crystallization times for the respective polymerization systems, and the Izod values (foot-pounds/inch of notch) of the resulting polymers are shown below in Table I.

TABLE I

| Example: | Solvent | Crystallization time (minutes) | Izod value |
|---|---|---|---|
| 17 | None | 13 | 1.18 |
| 18 | HMPT | 7 | 1.37 |
| 19 | DMSO | 7 | 3.88 |

The above data shows that both the rate of polymerization of the systems as well as the impact strength of the resulting polymers were significantly improved when a dipolar aprotic solvent was employed to facilitate the nucleophilic displacement reaction.

The term pot life, as used with respect to the polymerization systems of the present invention, means the period during which the monomer, catalyst and initiator components of such systems may all be in admixture in a molten state with each other without having the viscosity of the system increase to the point where it could no longer be easily handled as a liquid. The $\epsilon$-caprolactam polymerization systems of the present invention have a pot life of $>10$, and usually about 20 to 40, hours at $\leq 115°$ C. This pot life characteristic of the polymerization systems of the present invention allows them to be compounded or admixed and maintained as convenient one-package systems for prolonged periods of time for various purposes, such as shipping, molding machine down time, the blending of the components in the system with each other and with adjuvants and the preparation of large batches of the systems.

The lactam compounds which may be polymerized in accordance with the teachings of the present invention are all those which are capable of being polymerized anionically.

What is claimed is:

1. An improved process for anionically polymerizing lactam monomer with anionic lactam polymerization catalyst and anionic lactam polymerization initiator which comprises using as said initiator at least one compound containing in its structure at least one carbocyclic aromatic ring substituted with at least one halogen atom which has been activated towards nucleophilic substitution.

2. A process as in claim 1 in which said initiator has the structure

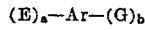

wherein
Ar is an aryl moiety residue,
E is halogen,
$a$ is a whole number which is 1 up to a number representing the number of substituent sites of Ar, and where $a$ is $>1$, E may be the same or different halogens,
G is H, $C_1$ to $C_{10}$ hydrocarbons, NO, $SO_2R$, COR, $CF_3$, $CCl_3$ or CN,
R is $C_1$ to $C_{10}$ hydrocarbon, with the proviso that where more than one R is present, the R's may be the same or different,
$b$ is zero or a whole number of a value such that the number of substituent sites of Ar minus $a$ equals $b$, and when $b$ is $>1$, G may be the same or different substituents, and
the H and hydrocarbon substituents directly bonded to Ar are present in no more than $a+b-2$ positions.

3. A process as in claim 2 in which said initiator is a halogenated benzonitrile.

4. A process as in claim 3 in which said initiator is 2,6-dichlorobenzonitrile.

5. A process as in claim 3 in which said initiator is p-fluorobenzonitrile.

6. A process as in claim 2 in which said initiator is a chlorobenzotrifluoride.

7. A process as in claim 1 in which said initiator has the structure

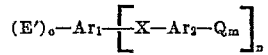

wherein
$Ar_1$ and $Ar_2$ are the same or different aryl moiety residues,
E' is halogen, H, $C_1$ to $C_{10}$ hydrocarbon, NO, $CCl_3$, $SO_2R$, COR, $CF_3$ or CN, with the proviso that at least one E' is halogen,
$c$ is a whole number which is 1 up to a number representing 1 less than the number of substituent sites of $Ar_1$, and where $c$ is $>1$, E' may be the same or different substituents,
X is SO, $SO_2$, CO, N=N, $C(CF_3)_2$, $C(CN)_2$, $CCl_2$, $CBr_2$, $CF_2$, $CI_2$ or POR,
Q is halogen, H, $C_1$ to $C_{10}$ hydrocarbon, NO, $CCl_3$, $SO_2R$, COR, $CF_3$ or CN, with the proviso that at least one Q is not H when X is $SO_2$ or CO,
R is $C_1$ to $C_{10}$ hydrocarbon,
$m$ is a whole number such that $m+1$ equals the number of substituent sites of $Ar_2$, and when $m$ is $>1$, Q may be the same or different substituents.
$n$ is a whole number which is at least 1 and is such that the number of substituent sites of $Ar_1$ minus $c$ equals $n$, and when $n$ is $>1$, X may be the same or different radical, and with the proviso that where more than one R is present, the R's may be the same or different.

8. A process as in claim 7 in which X is $SO_2$.

9. A process as in claim 8 in which said initiator is a bis(halo)sulfone.

10. A process as in claim 9 in which said initiator is bis(p-chlorophenyl)sulfone.

11. A process as in claim 9 in which said initiator is bis(p-fluorophenyl)sulfone.

12. A process as in claim 9 in which said initiator is a fluorophenyl phenyl sulfone.

13. A process as in claim 9 in which said initiator is 3,4,3',4'-tetrachloro-diphenyl sulfone.

14. A process as in claim 9 in which said initiator is 4-fluoro,4'-chloro-diphenyl sulfone.

15. A process as in claim 7 in which X is CO.

16. A process as in claim 15 in which said initiator is 4,4'-difluorobenzophenone.

17. A process as in claim 1 in which said initiator has the structure

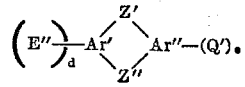

wherein

Ar′ and Ar″ are the same or different aryl moiety residues,

Z′ and Z″ are the same or different and are SO, $SO_2$, CO, N=N, $C(CF_3)_2$, $C(CN)_2$, $CCl_2$, $CBr_2$, $CF_2$, $CI_2$ or POR, E″ is halogen, H, $C_1$ to $C_{10}$ hydrocarbon, NO, $CCl_3$, $SO_2R$, COR, $CF_3$ or CN, with the proviso that at least one E″ is halogen, $d$ is a whole number which is 1 up to a number representing 2 less than the number of substituted sites of Ar′, and when $d$ is $>1$, E″ may be the same or different substituents, Q′ is halogen, H, $C_1$ to $C_{10}$ hydrocarbon, NO, $CCl_3$, $SO_2R$, COR, $CF_3$ or CN, $e$ is a whole number which is 1 up to a number representing 2 less than the number of substituted sites of Ar″, and when $e$ is $>1$, Q′ may be the same or different substituents, and R is $C_1$ to $C_{10}$ hydrocarbon, with the proviso that where more than one R is present, the R's may be the same or different.

18. A process as in claim 17 in which Z′ and Z″ are $SO_2$.

19. A process as in claim 18 in which said initiator is 2,7-dichlorothianthrene tetraoxide.

20. A process as in claim 1 in which the polymerization reaction is conducted in the presence of catalytic quantities of dipolar aprotic solvent.

21. A process as in claim 20 in which said solvent is hexamethyl phosphoramide.

22. A process as in claim 20 in which said solvent is dimethyl sulfoxide.

References Cited

UNITED STATES PATENTS

| | | | |
|---|---|---|---|
| 3,015,652 | 1/1962 | Schnell et al. | 260—78 L |
| 3,216,977 | 11/1965 | Brouns | 260—78 L |
| 3,220,983 | 11/1965 | Schmidt et al. | 260—78 L |
| 3,249,590 | 5/1966 | Pietrusza et al. | 260—78 L |
| 3,274,132 | 9/1966 | Giberson | 260—78 L X |
| 3,294,735 | 12/1966 | Twilley et al. | 260—78 L X |
| 3,417,178 | 12/1968 | Downing et al. | 260—78 L X |
| 3,444,142 | 5/1969 | Kolyer et al. | 260—78 L |

LUCILLE M. PHYNES, Primary Examiner

U.S. Cl. X.R.

260—78 P